Patented Mar. 23, 1948 2,438,312

UNITED STATES PATENT OFFICE 2,438,312

EXPANSION JOINT FOR HIGH TEMPERATURES

George P. Bunn, Bartlesville, Okla., and Howard J. Pankratz, Borger, Tex., assignors to Phillips Petroleum Company, a corporation of Delaware Application January 24, 1944, Serial No. 519,522

6 Claims. (Cl. 285—162)

This invention relates to an expansion joint for a pipe line carrying fluids at high temperatures wherein the expansion joint is of the lineal or telescoping type and the joint is sealed by means of packing.

Generally speaking, there are only two ways to compensate for lineal expansion in a pipe system, namely, by pipe flexibility and by expansion joints. Pipe flexibility makes use of bends, offsets and the like to reduce the effect of lineal movement. Pipe flexibility is limited in its use to relatively small lines and to places where space and extra length of line are of no concern.

Expansion joints may be divided into two types, packless type and packed type. The packless types are generally made with one or more corrugated bends to take the expansion movement. Most packless joints are limited in use to low temperatures because of the material of which the joints are made, or to relatively short movements because of early failure due to fatigue. The joints usually fail at the corrugated bend due to fatigue from the constant flexing of the joint.

The packed type of joint is essentially a hollow piston that can move inside a casing. A packing gland is placed between the piston and casing to hold the pressure within the pipe system. Expansion joint manufacturers will furnish and guarantee packing for service up to approximately 950° F. Packing can be supplied for joints operating at temperatures above 950° F., however, such packing is furnished at the purchaser's risk.

Since the trend in refinery and chemical manufacturing practice is to go to higher cracked temperatures, and since a number of oil companies use catalytic cracking in conjunction with high temperatures (both trends necessitating the use of direct and short lines and thus eliminating the possibility of pipe flexibility), some form of joint must be designed that can cope with the situation.

The present invention presents an expansion joint of the packed type in which the lineal expansion is absorbed through a piston. The pipes in the pipe line are of chrome steel and the temperature of the liquids flowing in the pipe line must be maintained at a high temperature. The pipe system is covered on the outside with some insulating material so that there is no heat loss. The sealing of the joint takes place in the packing member and between the slidable members is placed an insulating material of insulating fiber which just about half fills the space between the sliding members. In the other embodiment, a dead air space is further provided.

It is an object of the invention to provide an expansion joint for a pipe line conveying fluids at a high temperature.

It is a further object of the invention to provide an expansion joint of the packed type for a pipe line conveying fluids at a high temperature, wherein the joint is provided with insulating means to reduce the temperature of the joint at the packing point.

Other objects and advantages will be apparent from a study of the following specification when taken along with the drawings of which:

Figure 1:
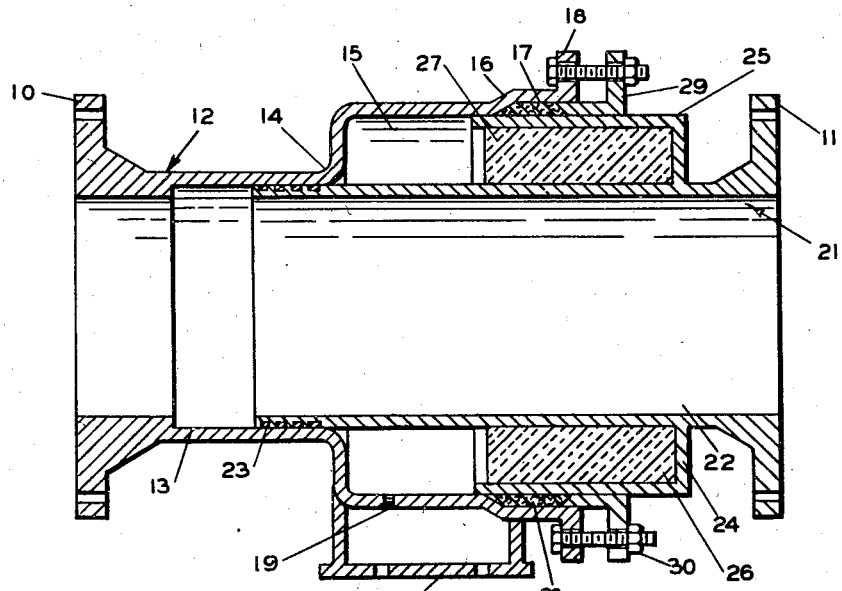
Figure 1 is a longitudinal sectional view of one embodiment of the joint showing insulation immediately under the packing.

In Figure 1, 10 and 11 represent the flanges of the joint that are connected into the pipe line, which flanges are attached by bolts to flanges on the pipes. The body or socket member is represented at 12 and has the socket or machined portion 13 to receive the piston end 22 of the other coupling member 21. The member 12 flares outwardly at 14 and provides another socket 15. The flared out portion 14 serves as a guide for the piston entering the socket 13. The member 12 again flares out at 16 and provides another socket member 17 with the member 12 finally terminating in the flange 18. In the bottom of the member 12 is the opening 19 to allow for drainage of any leakage into the space 15. The whole joint is supported on the base member 20.

The piston or male member 21 fits into the member 12 with the end 22 of the piston 21 having a close fit with the socket portion 13 and having piston rings 23 to aid in sealing the space between the socket 13 and the piston end 22. The piston 21 has integrally connected thereto the flange 24 which in turn has the extension 25 integrally connected to the flange 24 and at an angle of 90 degrees to the flange 24. The flange 24 and the extension 25 form a socket 26 into which is received an insulating material of insulating fiber 27. The end of the extension 25 is received in the socket 15 and there is a close machined fit between the extension 25 and the socket 15. A packing material 28 to resist a temperature of 850° F. is placed in the socket 17 and gland 29 by means of bolt 30 and flange 18 compresses the packing 28 around the extension 25.

One advantage of this joint over existing expansion joints is the inclusion of the void space 15 between the fluid passage in the pipe line and the packing 28. Any fluid that slips by the piston rings 23 will pass into the void space 15. This leakage can only be small and once in the void space, it will become stagnant and hence lose temperature rapidly to the metal of the joint which confines the void space 15. The only way the stagnant leakage fluid in the space 15 can come into contact with the packing 28 is to pass through the metal to metal joint at 16 with the extension 25. When this occurs the fluid touches the metal which is in contact with the surrounding atmosphere and the liquid is further reduced in temperature. By the time the fluid reaches the packing 28, the fluid is far below the temperature of the metal wall as at 16, consequently, the only way heat can reach the packing is through wall conduction.

The wall thickness of the joint would vary according to pressure with a minimum thickness, dependent upon mechanical requirements. Calculations and experiments have shown that with a fluid temperature of 1200° F., the maximum temperature at 24 is 800° F., and the maximum temperature in 27 is 600° F. These temperatures are based upon the diameter of joint and expansion expressed above and if this relationship is maintained, the above temperatures, with reasonable limits will govern for all size joints. If this relationship is changed, the temperature will also change.

Figure 2:
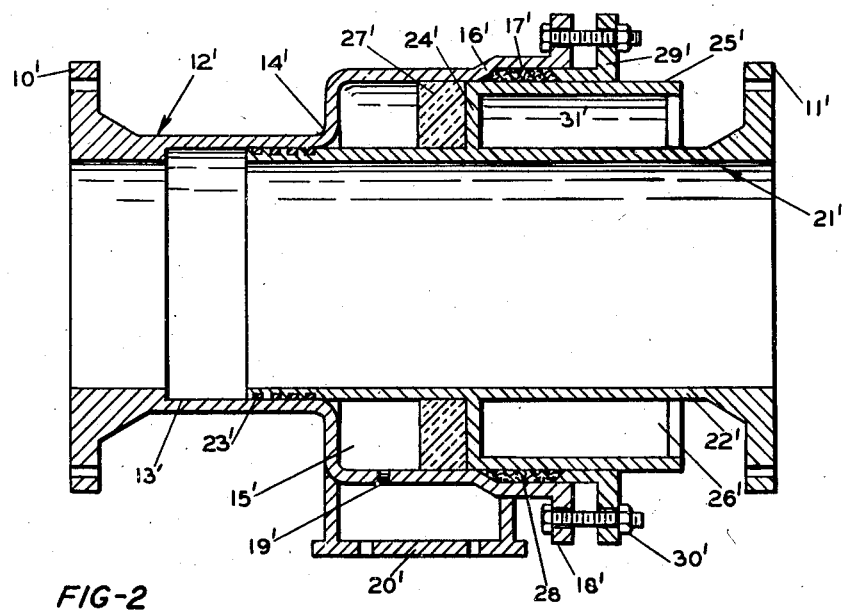
Figure 2 is a longitudinal sectional view of a similar joint showing a dead air space under the packing member.

In Figure 2, 10' and 11' represent the flanges of the joint that are connected into the pipe line the same as in Figure 1. The body or female member is represented at 12' and this whole socket member is the same as the socket member 12 in Figure 1. The socket 13' receives the piston 21' and end 22'. The socket 12' flares outwardly at 14' and provides another socket 15'. The member 12' again flares out at 16' and provides another socket 17' with the member 12' finally terminating in the flange 18'. In the bottom of the member 12' is the opening 19' to allow for drainage of any leakage into the space 15'. The whole joint is supported on the base 20'.

The piston or male member 21' fits into the member 12' with the end 22' of the piston 21' having a close fit with the socket portion 13' and having piston rings 23' to aid in sealing the space between the socket 13' and the piston end 22'. The piston 21' has integrally connected thereto the flange 24' which in turn has the extension 25' integrally connected to the flange 24' and at an angle of 90 degrees to the flange 24'. Figure 2 differs over Figure 1 in the extensions 25 and 25'. In Figure 1, the extension 25 extends into the socket member 12 from the flange 24 while in Figure 2, the extension 25' extends in the opposite direction, namely, outwardly from flange 24' and the socket member 12'. The extension 25' forms a seat for the packing 28' on the outside of the extension 25', while the inside of the extension 25' and the flange 24' form a socket 26' which is open to the surrounding air through the opening 31'. The socket 15' has a portion thereof filled with insulating fiber packing 27' with one end of the packing 27' abutting against the flange 24'. The flange 24' and extension 25' are received in the socket 15' and present a tight fit. A packing 28' to resist a temperature of 850° F. is placed in the socket 17' and gland 29' by means of bolt 30' and flange 18' compresses the packing 28' around the extension 25'.

This joint possesses all the advantages set forth for those stated for Figure 1 with the added advantage that the air cooled space 26' functions as a means of insulating the packing 28' from the fluids in the pipe line and further as a conductor to carry away heat from the packing 28'. The design of Figure 2 allows for a lower temperature at the packing 28'.

Figure 3:
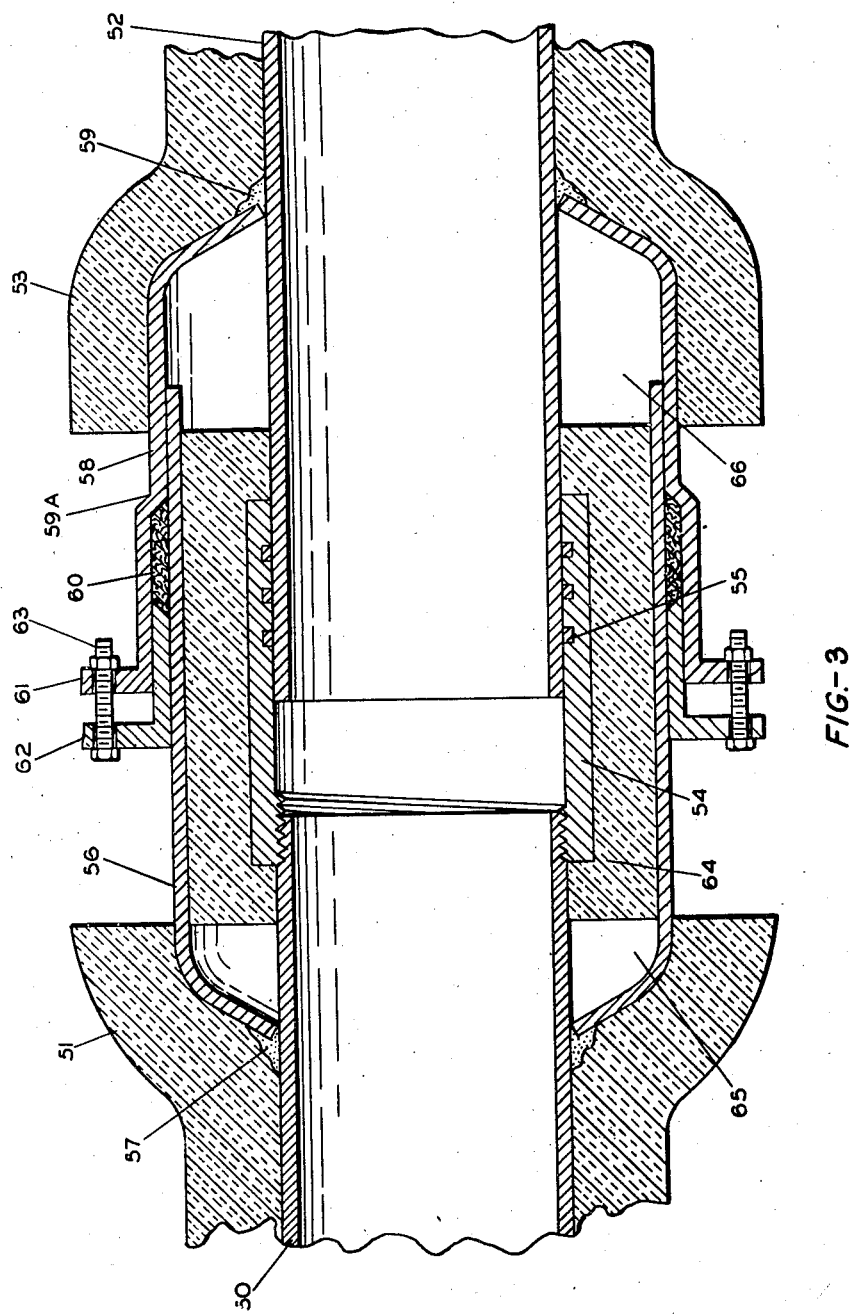
Figure 3 is a longitudinal sectional view of a different embodiment of joint showing the packing member protected from the contents in the pipe line.

Figure 3 shows another improvement in design with pipes 50 and 52 having insulating covers 51 and 53 joined by an expansion joint. Pipe 50 has the sleeve 54 with piston rings 55 attached to the end of the pipe. Pipe 52 fits into the sleeve 54 and is slidable therein. The collar 56 is welded to the pipe 50 at 57 while the collar 58 is welded to the pipe 52 at 59. Collar 56 is received in collar 58 and is slidable therein. The collar 58 is flared out at 59 to form a socket which receives packing 60 to seal the joint. The collar 58 has flange 61 on the end thereof and with gland 62 and bolt 63 functions to compress packing 60 about the collars 56 and 58. The space between the sleeve 54 and the collars 56 and 58 is filled with an insulating fiber packing 64 leaving spaces 65 and 66 at the ends for contraction of the joint.

The construction of the double wall in the form of a second piston eliminates the need of an extra yoke to serve as an external guide. The contact of this second piston against the larger bore serves as the external guide. The advantages of this joint are that it acts to protect the rock wool packing as the movement of the joint does not distort the packing which thus keeps leakage at a minimum.

Having thus described our invention, we claim:

1. An expansion joint for a high temperature pipe line comprising a female member and a male member slidably received in the female member, said female member having a plurality of sockets of increasing diameter, the innermost socket of least diameter receiving the end of the male member, a first sealing means between this socket and the end of the male member, an integral flange on the male member having an extension at right angles to the flange forming a collar, said collar fitting snugly into the second socket in the female member and operating to confine an insulating member, the collar forming with the third socket in the female member a space to receive a second packing, a second packing in said space with means for compressing the packing, and the temperature at the said second sealing means being lowered materially over the temperature in the pipe line thus insuring a leak proof seal at this point.

2. An expansion joint for a high temperature pipe line comprising a female member and a male member slidably received in the female member, said female member having a plurality of sockets of increasing diameter, the innermost socket of least diameter receiving the end of the male member, a first sealing means between this socket and the end of the male member, an integral flange on the male member having an extension at right angles to the flange and extending toward the end of the male member fitting into the female member to form a collar, said collar fitting snugly into the second socket in the female member and operating to confine an insulating member, the collar forming with the third socket in the female member a space to receive a second packing, a second packing in said space with means for compressing the packing, and the temperature at the said second sealing means being lowered materially over the temperature in the pipe line thus insuring a leak proof seal at this point.

3. An expansion joint for a high temperature pipe line comprising a female member and a male member slidably received in the female member, said female member having a plurality of sockets of increasing diameter, the innermost socket of least diameter receiving the end of the male member, a first sealing means between this socket and the end of the male member, an integral flange on the male member having an extension at right angles to the flange and extending in the opposite direction from the end of the male member which fits into the female member to form a collar, said collar fitting snugly into the second socket in the female member and operating to confine an insulating member, the collar forming with the third socket in the female member a space to receive a second packing, a second packing in said space with means for compressing the packing, and the temperature at the said second sealing means being lowered materially over the temperature in the pipe line thus insuring a leak proof seal at this point.

4. An expansion joint for a high temperature pipe line comprising a female member and a male member slidably received in the female member, said female member having a plurality of sockets of increasing diameter, the innermost socket of least diameter receiving the end of the male member, a first sealing means between this socket and the end of the male member, an integral flange on the male member having an extension at right angles to the flange and extending in the opposite direction from the end of the male member which fits into the female member to form a collar, said collar being open to the atmosphere and forming an air space between the main pipe line and the collar, said collar fitting snugly into the second socket in the female member and operating to confine an insulating member, the collar forming with the third socket in the female member a space to receive a second packing, a second packing in said space with means for compressing the packing, and the temperature at the said second sealing means being lowered materially over the temperature in the pipe line thus insuring a leak proof seal at this point.

5. An expansion joint for a high temperature pipe line comprising a sleeve attached to one pipe end, the other pipe end slidably received in the sleeve, a first sealing means between the pipe end and the sleeve, a collar attached to one pipe end and circumferentially spaced from the sleeve forming a female member, a second collar attached to the other pipe end and circumferentially spaced from the sleeve forming a male member slidable within the female collar member, a space between the telescoping collar members and the sleeve, an insulating medium in the space, a second sealing means between the telescoping collar members with means to compress the packing and the temperature at the said second sealing means being lowered materially over the temperature in the pipe line thus insuring a leak proof seal at this point.

6. An expansion joint for a high temperature pipe line comprising two telescoping members, said members having first and second pairs of telescoping surfaces, said members providing a space between said first and second pairs of telescoping surfaces, solid heat insulating material in said space, said first pair of telescoping surfaces sealing the interior of said pipe line from any substantial loss of hot fluids therefrom, said second pair of telescoping surfaces being provided with a stuffing box sealing the space from any flow of fluids therethrough, said solid heat insulating material being spaced between said first and second pairs of telescoping surfaces whereby said solid insulating material is protected from any substantial stream of hot fluid and said stuffing box is insulated from the heat of the hot fluid.

GEORGE P. BUNN.
HOWARD J. PANKRATZ.

REFERENCES CITED

The following references are of record in the file of this patent:

UNITED STATES PATENTS

| Number | Name | Date |
| --- | --- | --- |
| 553,509 | Burnham | Jan. 28, 1896 |
| 1,707,312 | McDaniel | Apr. 2, 1929 |
| 2,103,981 | Hall | Dec. 28, 1937 |
| 2,127,073 | Topping | Aug. 16, 1938 |